May 19, 1953     C. E. ANDERSON     2,638,667
SELF-SUPPORTING AUTOMATICALLY OPERABLE TUBE CUTTER
Filed Feb. 12, 1952     2 Sheets-Sheet 1

INVENTOR.
Clarence E. Anderson
BY
J.P. Moran
ATTORNEY

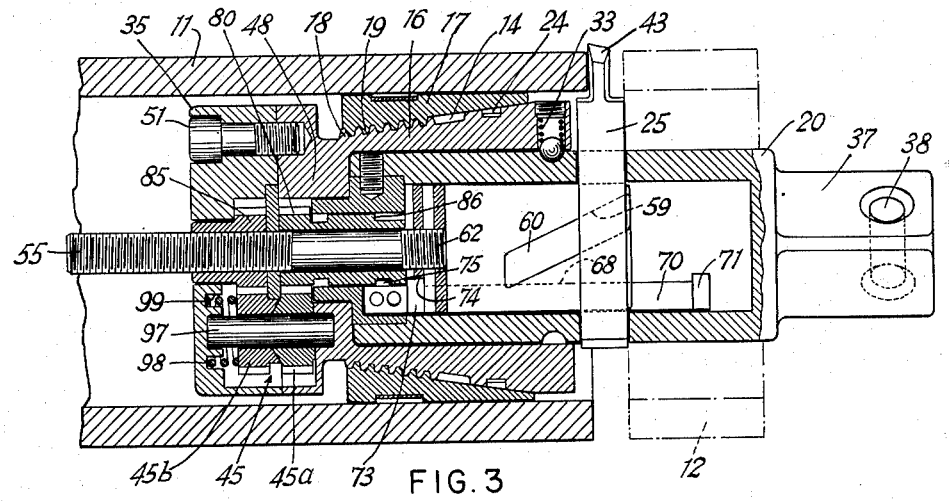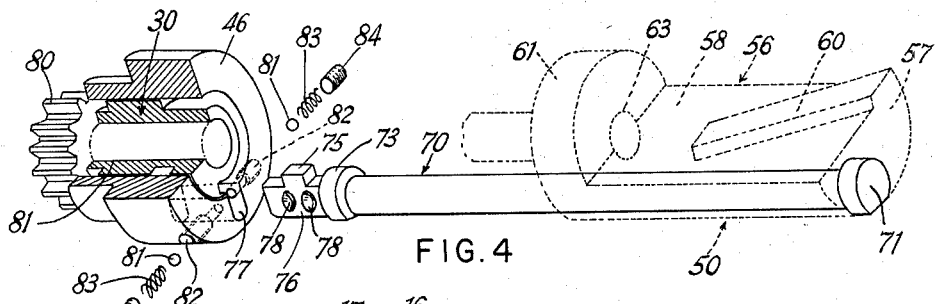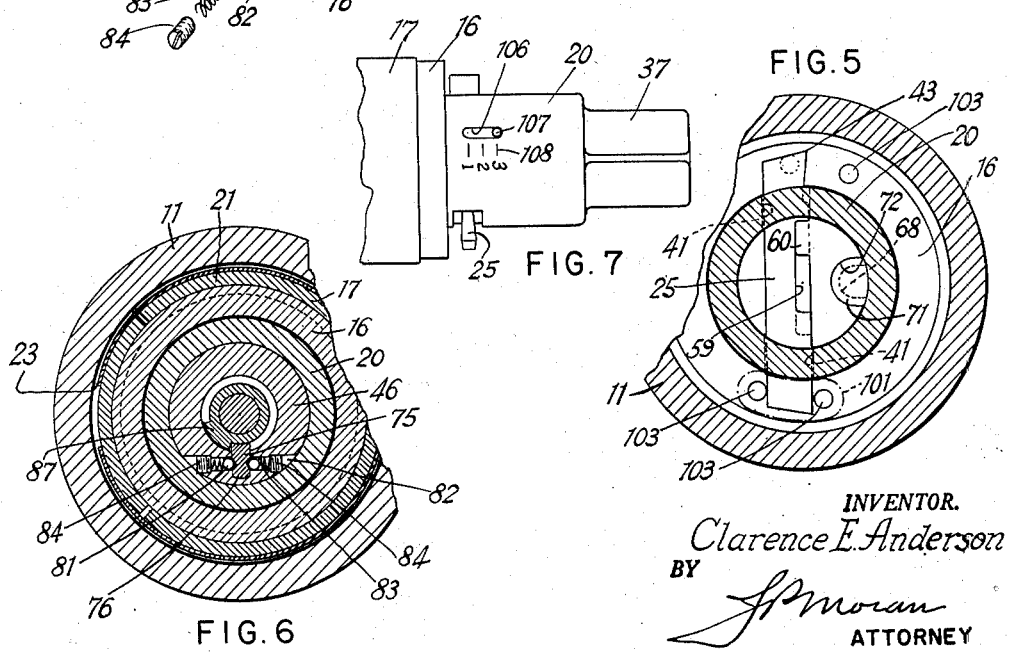

Patented May 19, 1953

2,638,667

UNITED STATES PATENT OFFICE 2,638,667

SELF-SUPPORTING AUTOMATICALLY OPERABLE TUBE CUTTER

Clarence E. Anderson, Wadsworth, Ohio, assignor to The Babcock & Wilcox Company, New York, N. Y., a corporation of New Jersey Application February 12, 1952, Serial No. 271,259

20 Claims. (Cl. 30—107)

This invention relates to tube cutting apparatus and, more particularly, to a self-contained and supported, automatically operable tube cut-off tool.

While the tool of the present invention is of general applicability to any tube cutting operation, it is more particularly designed for severing tubing sections from tubes assembled in a header of heat exchange apparatus. In the process of erecting heat exchangers, such as steam boilers, the tubes have their ends connected into suitable headers, generally by expanding the end of the tube against a tube seat formed in the header. At times, the tubes are longer than required so that it is necessary to remove the excess length of tube projecting into the header and beyond the tube seat.

The conventional method of removing this excess length, which is generally rather short, is to use a milling type cutter. This type of cutter removes the metal in relatively small chips, and if the excess to be removed is of any considerable length, considerable time is required for the operation. Furthermore, when the removal must be done inside small headers, where the handholes are not opposite the tube ends, the removal process becomes very tedious since the milling tool must then be operated with gear drives and some arrangement must be used to force the cutter against the tube surface being milled.

In accordance with the present invention, the foregoing difficulties are avoided and the tube section removal is expedited by providing a self-contained tubing cutter which needs no auxiliary means either to support it or to force the cutter against the surface to be cut. The tool of the present invention cuts the excess metal from the tube by making a narrow cut through the tube wall, so that the excess length is removed in the form of a section of tubing instead of in the form of many small chips. The invention tube cutter is further adaptable for use with gear drives inside headers, so that it facilitates cutting off tube sections that may not be directly opposite handholes.

To this end, the cutter includes a support having means, such as a collet chuck, for anchoring the tool in a stationary position relative to a tube. A carrier means is supported by the support and rotatable with respect thereto, this carrier means carrying a cutter rotatable therewith in substantially a plane determined by the relative position of the support. A cutter operator is supported by the carrier means, being movable relative thereto, and is operatively connected to the cutter to advance and retract the latter responsive to such relative movement. A differential gearing is included in the tool, and comprises a driving element rotatably supported by the carrier, a driven element connected to the operator and preferably in the form of a nut threaded on the operator, and intermediate connecting elements carried by the support.

The automatic operation is controlled by a releasable latch means which, during a cutting operation, connects the driving element of the gearing to the carrier for unitary rotation with the latter to operate the driven element and operator to advance the cutter to effect the cut. This latch means is automatically operable by the operator, after a pre-set depth of cut has been effected, to disconnect the driving element of the gearing from the carrier. Thereupon, the driven gearing element, with continued rotation of the carrier in the same direction, actuates the operator to retract the cutter.

For an understanding of the invention principles, reference is made to the following description of a typical practical embodiment thereof as illustrated in the accompanying drawings.

In the drawings:

Figs. 1, 2 and 3 are axial sectional views through the invention tube cutter as mounted in the tube to be cut, and respectively illustrating the tool immediately after insertion into the tubing, immediately following the beginning of a cut, and at the completion of the cut;

Fig. 4 is an exploded perspective view illustrating the cutter operator and the releasable latch means;

Fig. 5 is a diametric sectional view on the line 5—5 of Fig. 1;

Fig. 6 is a diametric sectional view on the line 6—6 of Fig. 2;

Fig. 7 is a partial elevation view illustrating the driving end of the cutter;

Figure 1:
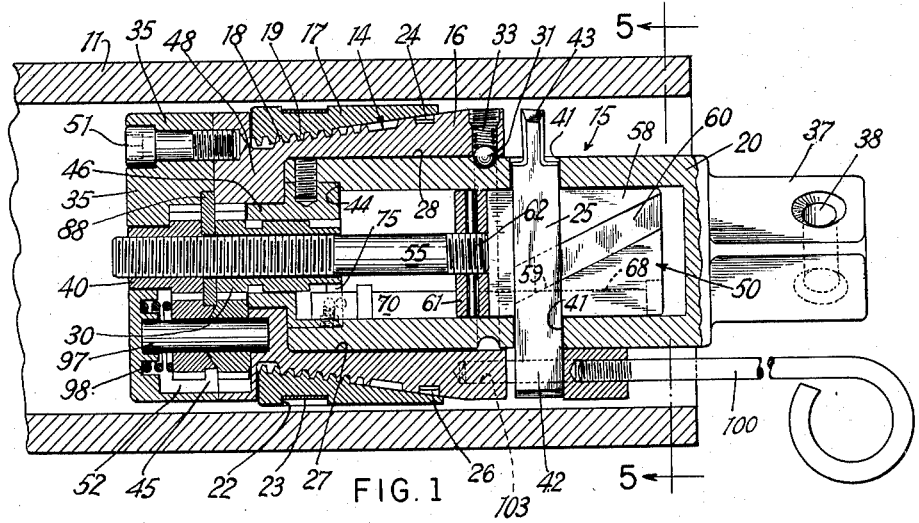
Figure 2:
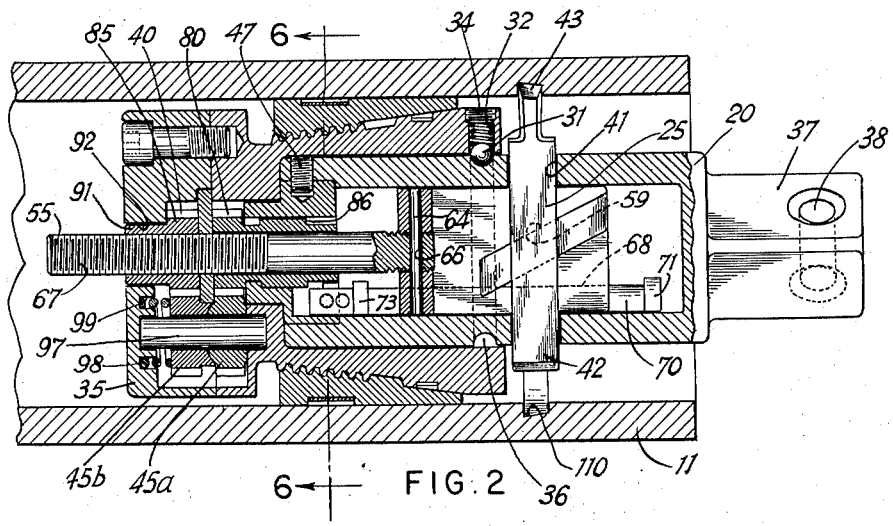

Referring to the drawings, the invention tube cutter generally illustrated at 15 is shown, in Figs. 1, 2 and 3, as disposed within a tube 11 from which a tubing section 12 (Fig. 3) is to be severed. The support for the tool 15 in tubing 11 is in the form of a collet clutch generally indicated at 14 and comprising an inner member 16 and an expansible outer member 17, threadedly interconnected. For this purpose, the outer surface of member 16 is substantially frusto-conical and provided with threads 18 interconnected with threads 19 on the substantially frusto-conical inner surface of member 17. As best seen in Fig. 6, member 17 comprises a series of segmental sections 21 having circumferentially aligned relatively shallow grooves 22 which receive a clamping spring 23 holding the segments in assembled relation on inner element 16. A piston ring 24 may be disposed in a slot 26 on the outer surface of element 16. From the foregoing description, it will be clear that relative rotation of clutch elements 16 and 17 will cause relative longitudinal movement thereof and, due to the frusto-conical engaging surfaces of the elements, this will effect expansion and contraction of element 17 on element 16. In a manner to be described, such relative rotation is effected by temporarily connecting element 16 to the rotatable driving means for the tool, element 17 being held stationary by frictional engagement with the tube wall.

The inner element 16 has a substantially cylindrical recess 27 therein forming a bearing surface engaging the cylindrical outer surface 28 of a cutter carrier 20 supporting cutter 25 for radial movement toward and away from the tubing wall. Relative longitudinal or axial movement of elements 16 and 20 is prevented by means of a ball 31 held in a socket 32, through the wall of element 16, by a spring 33 positioned by a nut 34 threaded into the outer end of socket 32. Ball 31 rides in a circumferential groove 36 in the outer surface of carrier 20 and radially aligned with socket 32.

The outer end of carrier 20 is formed with a polygonal cross sectional shank 37 having a hole 38 extending between two faces, by means of which suitable driving means may be connected to the tool to rotate carrier 20. Intermediate its ends, the carrier 20 has a pair of diametrically aligned apertures 41 conforming in cross section to that of the shank 42 of tool 25. The latter is formed with a relatively narrow projecting cutting tip 43, and the tool 25 mounted in the apertures 41 is radially movable relative to carrier 20 but restrained against longitudinal displacement relative thereto. The inner end of carrier 20 has a circumferential recess 44 receiving a hollow bearing 46 for the driving element 30 of the differential gearing, bearing 46 being held in position by a set screw 47 threaded through the wall of carrier 20 and into the enlarged outer end of bearing 46. The reduced inner end of bearing 46 seats within an inwardly projecting flange 48 on the inner end of clutch element 16. Flange 48 also forms a seat for an end cap 35 secured to clutch element 16 by socket-type studs 51 seated in recesses in the end cap and threaded into flange 48. End cap 35 provides a bearing for the driven element 40 of the differential gearing and, in cooperation with flange 48, provides a chamber or housing 52 for a torque responsive clutch generally indicated at 45 and forming the intermediate element of the differential gearing.

The operator for tool 25 includes a camming element 50 and a shaft 55. Element 50 is generally in the form of an axially and radially sectioned cylinder having a diameter such that the element has a relatively close sliding fit within the cylindrical carrier 20. The outer end of the element 50 has a semi-cylindrical shape, as indicated at 56, including a cylindrical surface 57 bearing within carrier 20 and a flat, substantially axial surface 58 having a rectangular cross section cam shoulder 60 extending diagonally thereacross. The outer end of shoulder 60 terminates at substantially the radially outer edge of portion 56 and the inner end of the shoulder terminates somewhat short of the other outer edge of flat surface 58. The relative relation of surface 58, and the relative depth of shoulder 60, are such that an axial plane through the element 50 will bisect shoulder 60. In other words, substantially one half the thickness of the shoulder lies on either side of the axial plane. The inner end of surface 58 is defined by a relatively thick semi-cylindrical flange 61.

Shaft 55 has a right hand threaded outer end 62 threaded into an axial passage 63 in the inner end of element 50, and the shaft is held against rotation relative to element 50 by a pin 64 extending diametrically of the inner end of element 50 and through a diametric aperture 66 in the inner end of shaft 55. For a purpose to be described, the outer end of shaft 55 is provided with a left hand thread 67, and the shaft 55 extends axially through the driving and driven elements of the differential gearing.

The semi-cylindrical portion of operator element 50 is provided with a longitudinally extending passage 68 which receives a latch bar 70. The outer end of bar 70 has an enlarged head 71 which is arranged to seat in a counter-sunk recess 72 at the outer end of passage 68. Near its other end, latch bar 70 has a second enlarged head 73 arranged to seat in an enlarged recess 74 at the inner end of passage 68. Beyond head or shoulder 73, latch bar 70 has a rectangular extension 76 carrying a radially inwardly projecting tooth 75. Extension 76 is arranged to engage into a correspondingly shaped radial recess 77 in bearing 76, and the extension has a pair of longitudinally spaced recesses 78 on each side thereof. These recesses are arranged to be engaged by small balls 81 mounted in passages 82 extending normal to slot 77 and in opposed directions therefrom. Balls 81 are biased toward slot 77 by springs 83 held in position by set screws 84 threaded into passages 82. The spring biased balls 81, in cooperation with the shallow recesses 78, form releasable latch means for holding latch bar 70 in either one of two longitudinally spaced positions. The tooth 75 forms a selectively operable latch for the driving element of the differential gearing, as will be explained.

One surface of tool 25 is formed with a diagonally extending slot 59 which is slidably engaged with shoulder 60. Thus, as the operator comprising element 50 and shaft 55 is moved axially or longitudinally of carrier 20, tool 25 is simultaneously projected or retracted by the interaction of diagonal camming shoulder 60 on diagonal camming slot 59 in the tool surface.

The driving element 30 of the differential gearing is a generally cylindrical member having an axially extending aperture slightly larger in diameter than shaft 55, the element fitting over shaft 55 and having an intermediate enlarged shoulder 86 forming a bearing surface engaging in bearing 46. As best seen in Figs. 4 and 6, the outer end of driving element 30 has a substantially sector-shaped projection 87 which lies in the path of the tooth 75 carried by extension 76 of latch bar 71. It will be noted from Figs. 1, 2 and 3 that segment 87 is axially spaced from bearing shoulder 86 by a distance slightly in excess of its own axial width, and the tooth 75 has an axial width substantially equal to that of segment 87. Consequently, in the position of latch bar 70 shown in Fig. 1, tooth 75 is engaged with segment 87 but, in the position of Fig. 3, the latch bar has been moved inwardly so that tooth 75 lies between segment 87 and shoulder 86. When the tooth 75 is engaged with shoulder 87, driving element 30 is locked to rotate with carrier 20 whereas, when the tooth is disengaged from shoulder 87, element 30 is not rotated by carrier 20.

The inner end of element 30 is formed as a spur gear 80. A thrust washer 88 seated in a recess in the inner face of cap 35 lies between driving element 30 and driven element 40. The latter is formed with a spur gear 85 on its outer end, and a reduced cylindrical shoulder 91 on its inner end having bearing engagement in an axial recess 92 in cap 35. For a purpose to be described, spur gear 80 of driving element 30 has one more gear tooth than spur gear 85 of driven element 40. In a specific example, spur gear 80 may have fifteen teeth and spur gear 85 fourteen teeth.

Figures 8, 9, 10:
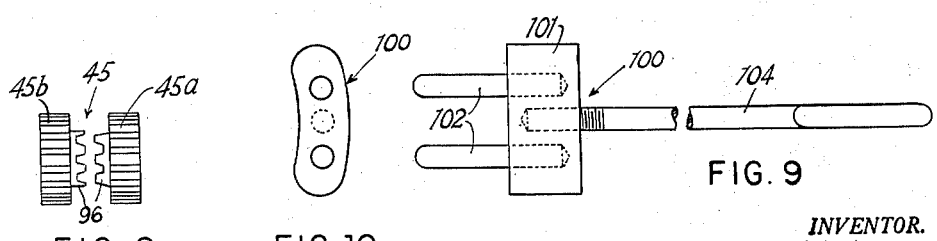
Fig. 8 is an elevation view of a torque responsive clutch included in the differential gearing.
Fig. 9 is a plan view of a holding device for selectively locking one element of the collet clutch to the tool carrier for rotation therewith to operate the clutch.
Fig. 10 is a left end elevation view of the holding device shown in Fig. 9.

The intermediate element of the differential gearing is in the form of a torque responsive clutch 45, and is best illustrated in Fig. 8 as comprising two substantially identical spur gears 45a and 45b. These spur gears have intermeshing clutching jaws or teeth 96 on the facing surface, and are mounted on a shaft or pin 97 seated in aligned recesses in the inner surface of cap 35 and in the flange 48 of collet clutch member 16. A coil spring 98 is seated in an annular recess 99 in the inner surface of cap 35 and surrounding shaft 97, and this coil spring bears against the surface of gear 45b to maintain the two gears engaged to rotate as a unit until such time as the torque thereon exceeds a pre-set value. Should the torque exceed a pre-set value at which damage to the tool might occur, gear 45b will be forced to the left (Figs. 1, 2 and 3) compressing spring 98 and, in effect, disconnecting the drive for tool 25. The two spur gears 45a and 45b have the same number of teeth, fifteen in the selected example, and respectively mesh with driving element spur gear 80 and driven element spur gear 85.

*Operation of the tool*

To effect a cut in tubing 11, the tool 15, with the collet clutch 14 in contracted position, is inserted into the tubing until such time as the cutting tip 43 of tool 25 is located at the desired line of cut. Preferably, the collet clutch is at least partially expanded so that the tool has a frictional sliding fit within the tubing.

To expand the collet clutch against the tube inner wall, clutch element 16 is releasably latched to carrier 20 so that the clutch element will be rotated when torque is applied to the driving end 37 of carrier 20. Such locking is effected by the tool 100 shown in Figs. 1, 9 and 10. This tool comprises an arcuate block 101 having an inner radius substantially equal to the outer radius of the cylindrical portion of carrier 20. A pair of circumferentially spaced pins 102 are fixed to extend from the inner face of block 101, and their spacing is such that they will closely embrace the end of tool 25 opposite to the cutting tip 43. The pins 102 fit into correspondingly spaced holes or recesses 103 (Figs. 1 and 5) in the outer face of clutch element 16. An operating handle 104, which may be any desired length, is threaded into block 101 to extend therefrom in the opposite direction to pins 102. When tool 100 is placed in position, with pins 102 embracing tool 25 and engaged in recesses 103, clutch element 16 will rotate with carrier 20 so that clockwise rotation of the carrier will thread element 16 to element 17 to move the latter outwardly along element 16 and radially into tight frictional engagement with the inner wall of tubing 11. When a sufficiently tight fit of the tool in the tubing has been attained, tool 100 is withdrawn.

The parts of the tool are now in a position intermediate those shown in Figs. 1 and 2. Prior to insertion of the tool into the tubing, latch bar 70 has been moved to an intermediate position in which tooth 75 is aligned with shoulder 87 of driving gear element 30. This is effected by the arrangement shown in Fig. 7. Carrier 20 has a longitudinally extending slot 106 therein aligned with latch bar 71. The latch bar has a recess 107 in its radially inner surface, and adjacent slot 106 are three spaced indicating marks 108 each provided with a designating numeral. Normally, the recess 107 will be opposite the middle mark, due to the previous tube cutting operation. However, the latch bar may be moved outwardly to a position where recess 107 is at the outer end of slot 106 and tooth 75 is disposed axially outwardly of shoulder 87. This position of the tooth, which is not illustrated in the drawings, is an "emergency" position providing for rapid withdrawal of the tool from the tubing. If the latch bar 70 is in this outermost position, a piece of relatively stiff wire may be inserted into slot 106 to engage in recess 107 to move the latch bar to the intermediate position of Figs. 1 and 2, where it is releasably latched by the interaction of balls 81 in the rearmost recess 78 of extension 76. If desired, a small aperture may be formed through the outer end of the cylindrical portion of carrier 20 in alignment with latch bar 70 so that a piece of stiff wire may be used to move the latch bar to the innermost position at any time, if so desired. This aperture has not been illustrated in the drawing because Figs. 1, 2, and 3 show the latch bar rotated into substantially the plane of tool 25 for simplicity of illustration. By reference to Figs. 4 and 5, it will be clear that the latch bar is actually in a plane at right angles to the plane of movement of tool 25. This procedure has been adapted in order to clearly illustrate the sequence of action of the tool parts in the three principal figures.

With latch bar 70 in the intermediate position, and thus with tooth 75 adapted to engage shoulder 87, the differential gearing driving element 30 is locked to carrier 20. When carrier 20 is rotated clockwise, driving element 30, driven element 40, and shaft 55 are also rotated clockwise. However, due to the difference of one in the number of teeth on the driving and driven spur gears, both of which are engaged with the torque responsive clutch gears 45, driven element 40 rotates in a leading direction clockwise relative to driving element 30 and shaft 55. With the specific gear ratios chosen, the driven element 40 will rotate by the width of one tooth relative to shaft 55 during each revolution. As the shaft 55 is formed with a left handed thread meshing with a similar left handed thread in driven element 30, the shaft 55 will thus tend to thread through element 40 inwardly, or to the left as viewed in Figs. 1, 2 and 3. This moves operator element 50 to the left so that the interaction of shoulder 60 and tool slot 59 moves cutter 25 outwardly. The rate of cutter movement is approximately .004″ for each revolution of carrier 20, and with the specific gear ratios selected for the given example. The cutting tip 43 is thus advanced into the tubing wall, as shown in Fig. 2, to make a cut 110 therein. The foregoing cutting operation proceeds at a relatively slow rate until tip 43 has formed the cut 110 all the way through the wall of tube 11. At this time, the head 73 of latch bar 70 will seat in the recess 74 on the inner end of element 50 so that, when the element 50 moves further to the left, latch bar 70 is snapped from the intermediate position to the innermost position as shown in Fig. 3.

Tooth 75 is now disengaged from, and out of alignment with, shoulder 87, so that driving element 30 is no longer locked to rotate with carrier 20. Due to the frictional action of spring 98 in holding torque responsive clutch 45 stationary, gears 80 and 85 are also held stationary. Consequently, continued rotation of shaft 55 with continued rotation of carrier 20 causes the shaft to rapidly thread through driven element 40 to the right. This correspondingly moves element 50 to the right, so that the interaction of shoulder 60 in slot 59 rapidly retracts tool 25 to the position shown in Fig. 1. When the element 50 nears the limit of its outward movement, head 71 of latch bar 70 engages in recess 72 so that, upon further movement of element 50 to the right, latch bar 70 is moved to the intermediate position of Figs. 1 and 2 wherein tooth 75 is again aligned with shoulder 87.

The tool 100 may now be replaced in position to lock carrier 20 to clutch element 16. When the shank 37 is rotated counter-clockwise, clutch element 17 will move axially to the left along clutch element 16 and the segments 21 will be radially retracted by the spring 23 to disengage the clutch from the inner surface of the tubing so that the tool 15 may be withdrawn.

From the foregoing, it will be noted that a self-contained and supported automatically operable tube cut-off tool has been provided which can be quickly and accurately positioned at the desired position relative to a tube and quickly locked in such position by expansion of the collet clutch. Continued rotation of the tool carrier in a clockwise direction slowly advances the cutter through the tubing wall and, at the completion of the cut, the parts of the tool automatically operate to condition the differential gearing so that further continued rotation of the tool carrier in a clockwise direction rapidly retracts the cutter. At the limit of cutter retraction, the parts are automatically positioned properly for making the next cut.

While a specific embodiment of the invention has been shown and described in detail to illustrate the application of the invention principles, it will be understood that the invention may be otherwise embodied without departing from such principles.

I claim:

1. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of support; an operator supported by said carrier means and movable relative thereto, said operator being operatively connected to said cutter means to advance and retract the same responsive to such relative movement of the operator; differential gearing means including a driving element rotatably supported by said carrier means, a driven element connected to said operator, and connecting means for said elements carried by said support; and releasable latch means operable to connect said driving element to said carrier means for unitary rotation therewith to operate said driven element and operator to advance said cutter means to effect a cut in a tube; said latch means being operable by said operator, after a pre-set depth of cut has been effected, to disconnect said driving element from said carrier means; said driven element, upon continued rotation of said carrier means, thereupon operating said operator to retract said cutter means.

2. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of support; an operator supported by said carrier means and movable relative thereto, said operator being operatively connected to said cutter means to advance and retract the same responsive to such relative movement of the operator; differential gearing means including a driving element rotatably supported by said carrier means, a driven element connected to said operator, and connecting means for said elements carried by said support; and releasable latch means operable to connect said driving element to said carrier means for unitary rotation therewith to operate said driven element and operator to advance said cutter means at a relatively slow rate to effect a cut in a tube; said latch means being operable by said operator, after a pre-set depth of cut has been effected, to disconnect said driving element from said carrier means; said driven element, upon continued rotation of said carrier means in the same direction, thereupon operating said operator to retract said cutter means at a relatively fast rate.

3. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of support; an operator supported by said carrier means and movable relative thereto, said operator being operatively connected to said cutter means to advance and retract the same responsive to such relative movement of the operator; differential gearing means including a driving element rotatably supported by said carrier means, a driven element connected to said operator, and connecting means for said elements carried by said support, said connecting means including a torque responsive releasable clutch; and releasable latch means operable to connect said driving element to said carrier means for unitary rotation therewith to operate said driven element and operator to advance said cutter means to effect a cut in a tube; said latch means being operable by said operator, after a pre-set depth of cut has been effected, to disconnect said driving element from said carrier means; said driven element, upon continued rotation of said carrier means, thereupon operating said operator to retract said cutter means.

4. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of support; an operator supported by said carrier means and movable relative thereto, said operator being operatively connected to said cutter means to advance and retract the same responsive to such relative movement of the operator; differential gearing means including a driving element rotatably supported by said carrier means, a driven element connected to said operator, and connecting means for said elements carried by said support and normally fixed against rotation relative to said support; and releasable latch means operable to connect said driving element to said carrier means for unitary rotation therewith; said differential gearing means being constructed and arranged to effect relatively slow rotation of said driven element relative to said driving element when the latter is connected to rotate with said carrier means to operate said operator to advance said cutter means at a relatively slow rate to effect a cut in a tube; said latch means being operable by said operator, after a pre-set depth of cut has been effected, to disconnect said driving element from said carrier means; said differential gearing elements being held against rotation by said connecting means, when said latch means is so released, to effect relatively rapid relative rotation of said driven element and said carrier means upon continued rotation of the latter in the same direction to operate said operator to retract said cutter means.

5. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatably supported by said carrier means, a driven element threadedly engaged with said shaft, and connecting means for said elements carried by said support; and releasable latch means operable to connect said driving element to said carrier means for unitary rotation therewith to operate said driven element to move said shaft and operator to advance said cutter means to effect a cut in a tube; said latch means being operable by said operator, after a pre-set depth of cut has been effected, to disconnect said driving element from said carrier means; said driven element upon continued rotation of said carrier means, thereupon operating said operator to retract said support.

6. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatably supported by said carrier means, a driven element threadedly engaged with said shaft, and connecting means for said elements carried by said support; releasable latch means operable to connect said driving element to said carrier means for unitary rotation therewith to operate said driven element to move said shaft and operator to advance said cutter means at a relatively slow rate to effect a cut in a tube; said latch means being operable by said operator, after a pre-set depth of cut has been effected, to disconnect said driving element from said carrier means; said driven element, upon continued rotation of said carrier means in the same direction, thereupon moving said shaft and said operator to retract said cutter means at a relatively fast rate.

7. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatably supported by said carrier means, a driven element threadedly engaged with said shaft, and connecting means for said elements carried by said support; said connecting means including a torque responsive releasable clutch; and releasable latch means operable to connect said driving element to said carrier means for unitary rotation therewith to operate said driven element to move said shaft and operator to advance said cutter means to effect a cut in a tube; said latch means being operable by said operator, after a pre-set depth of cut has been effected, to disconnect said driving element from said carrier means; said driven element, upon continued rotation of said carrier means, thereupon moving said shaft and said operator to retract said cutter means.

8. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatably supported by said carrier means, a driven element threadedly engaged with said shaft, and connecting means for said elements carried by said support and normally fixed against rotation relative to said support; and releasable latch means operable to connect said driving element to said carrier means for unitary rotation therewith; said differential gearing means being constructed and arranged to effect relatively slow rotation of said driven element relative to said shaft when the latter is connected to rotate with said carrier means to operate said operator to advance said cutter means at a relatively slow rate to effect a cut in a tube; said latch means being operable by said operator, after a pre-set depth of cut has been effected, to disconnect said driving element from said carrier means; said differential gearing elements being held against rotation by said connecting means, when said latch means is so released, to effect relatively rapid relative rotation of said driven element and said shaft, upon continued rotation of the latter in the same direction, to operate said operator to retract said cutter means.

9. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatably supported by said carrier means, a driven element threadedly engaged with said shaft, and connecting means for said elements carried by said support and normally fixed against rotation relative to said support; and releasable latch means operable to connect said driving element to said carrier means for unitary rotation therewith; said differential gearing means being constructed and arranged to effect relatively slow rotation of said driven element in a leading direction relative to said shaft when the latter is connected to rotate with said carrier means to operate said operator to advance said cutter means at a relatively slow rate to effect a cut in a tube; said latch means being operable by said operator, after a pre-set depth of cut has been effected, to disconnect said driving element from said carrier means; said differential gearing elements being held against rotation by said connecting means, when said latch means is so released, to effect relatively rapid rotation of said shaft in a leading direction relative to said driven element, upon continued rotation of said carrier means in the same direction, to operate said operator to retract said cutter means.

10. A tube cutter is claimed in claim 1 in which said anchoring means comprises an expansible collet clutch including threadedly engaged inner and outer members, the outer member being expansible and contractible responsive to relative rotation of said clutch members; and means selectively operable to interconnect the clutch inner member and said carrier means whereby said collet clutch is operable by rotation of said carrier means.

11. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatable in said carrier means and mounted for free rotation coaxially of said shaft, a driven element threadedly engaged with said shaft, and gear means carried by said support and engaged with both said elements and normally fixed against rotation relative to said support; said driving and driven elements differing by one in their number of teeth; and releasable latch means operable to connect said driving element to said carrier means for unitary rotation therewith whereby, as said carrier, said shaft, said operator, and said elements are rotated, said driven element will rotate relatively to said shaft at a relatively slow rate to move the latter axially to operate said operator to advance said cutter means at a relatively slow rate to effect a cut in a tube; said latch means being operable by said operator, after a pre-set depth of cut has been effected, to disconnect said driving element from said carrier means; said differential gearing elements being held against rotation by said gear means, when said latch means is so released, to effect relatively rapid relative rotation of said driven element and said shaft, upon continued rotation of the latter in the same direction, to operate said operator to retract said cutter means.

12. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatable in said carrier means and mounted for free rotation coaxially of said shaft, a driven element threadedly engaged with said shaft, and gear means carried by said support and engaged with both said elements and normally affixed against rotation relative to said support; said driving and driven elements differing by one in their number of teeth; and releasable latch means operable to connect said driving element to said carrier means for unitary rotation therewith whereby, as said carrier, said shaft, said operator, and said elements are rotated, said driven element will rotate relatively to said shaft at a relatively slow rate to move the latter axially to operate said operator to advance said cutter means at a relatively slow rate to effect a cut in a tube; said latch means being operable by said operator, after a pre-set depth of cut has been effected, to disconnect said driving element from said carrier means; said differential gearing elements being held against rotation by said gear means, when said latch means is so released,to effect relatively rapid relative rotation of said driven element and said shaft upon continued rotation of the latter in the same direction to operate said operator to retract said cutter means; said gear means including a torque responsive releasable clutch.

13. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith, said operator being operatively connected to said cutter means to advance and retract the same responsive to such axial movement; a threaded shaft fixed to and extending axially from said operator; differential gearing means including a driving element rotatable in said carrier means and mounted for free rotation coaxially of said shaft, a driven element threadedly engaged with said shaft, and gear means carried by said support and engaged with both said elements and normally fixed against rotation relative to said support; said driving and driven elements differing by one in their number of teeth; and a latch bar slidably mounted in said carrier means and rotatable therewith, said latch bar having a projection selectively engageable with said driving element to connect said driving element to said carrier means for unitary rotation therewith, and having a first abutment engageable by said operator, in substantially the fully retracted position of said cutter means, to move said bar to engage said projection with said driving element whereby, as said carrier, said shaft, said operator, and said elements are rotated, said driven element will rotate relatively to said shaft at a relatively slow rate to move the latter axially to operate said operator to advance said cutter means at a relatively slow rate to effect a cut in a tube, and having a second abutment engageable by said operator, in substantially the fully advanced position of said cutter means, to move said bar to disengage said projection from said driving element; said differential gearing elements being held against rotation by said gear means, when said latch bar is so released, to effect relatively rapid relative rotation of said driven element and said shaft, upon continued rotation of the latter in the same direction, to operate said operator to retract said cutter means.

14. A tube cutter comprising, in combination, a support having means for anchoring it in a stationary position relative to a tube; carrier means supported by the support and rotatable with respect thereto; cutter means carried by said carrier means and rotatable therewith in substantially a plane determined by the position of the support; an operator mounted for axial movement in said carrier means and rotatable therewith; said operator being operatively connected to said cutter means to advance and retract the same responsive to such axial movement; a threaded shaft fixed to and extending axially from said operator; differential gearing means including a driving element rotatable in said carrier means and mounted for free rotation coaxially of said shaft; a driven element threadedly engaged with said shaft, and gear means carried by said support and engaged with both said elements; and normally fixed against rotation relative to said support; said driving and driven elements differing by one in their number of teeth; and a latch bar slidably mounted in said carrier means and rotatable therewith, said latch bar having a projection selectively engageable with said driving element to connect said driving element to said carrier means for unitary rotation therewith, and having a first abutment engageable by said operator, in substantially the fully retracted position of said cutter means, to move said bar to engage said projection with said driving element whereby, as said carrier, said shaft, said operator, and said elements are rotated, said driven element will rotate relatively to said shaft at a relatively slow rate to move the latter axially to operate said operator to advance said cutter means at a relatively slow rate to effect a cut in a tube, and having a second abutment engageable by said operator, in substantially the fully advanced position of said cutter means, to move said bar to disengage said projection from said driving element; said differential gearing elements being held against rotation by said gear means, when said latch bar is so released, to effect relatively rapid relative rotation of said driven element and said shaft, upon continued rotation of the latter in the same direction, to operate said operator to retract said cutter means; said carrier means having access means aligned with said bar for insertion of a relatively rigid element to engage said bar and move the same to the release position in the event of jamming of the tube cutter.

15. A tube cutter comprising, in combination, a support having means for anchoring it in a stationary position relative to a tube; carrier means supported by the support and rotatable with respect thereto; cutter means carried by said carrier means and rotatable therewith; an operator supported by said carrier means and movable relative thereto, said operator being operatively connected to said cutter means to advance and retract the same responsive to such relative movement of the operator; differential gearing means operatively interconnecting said carrier means and said operator; and releasable latch means operable to condition said gearing means to operate said operator to advance said cutter means to effect a cut in a tube; said latch means being operable by said operator, after a pre-set depth of cut has been effected, to render said gearing means ineffective to operate said operator to further advance said cutter means.

16. A tube cutter comprising, in combination, a support having means for anchoring it in a stationary position relative to a tube; carrier means supported by the support and rotatable with respect thereto; cutter means carried by said carrier means and rotatable therewith; an operator supported by said carrier means and movable relative thereto, said operator being operatively connected to said cutter means to advance and retract the same responsive to such relative movement of the operator; differential gearing means operatively interconnecting said carrier means and said operator; and releasable latch means operable to condition said gearing means to operate said operator to advance said cutter means to effect a cut in a tube; said latch means being operable by said operator, after a pre-set depth of cut has been effected, to condition said gearing means to operate said operator to retract said cutter means.

17. A tube cutter comprising, in combination, a support having means for anchoring it in a stationary position relative to a tube; carrier means supported by the support and rotatable with respect thereto; cutter means carried by said carrier means and rotatable therewith; an operator supported by said carrier means and movable relative thereto, said operator being operatively connected to said cutter means to advance and retract the same responsive to such relative movement of the operator; differential gearing means operatively interconnecting said carrier means and said operator, and including a torque responsive releasable clutch; and releasable latch means operable to condition said gearing means to operate said operator to advance said cutter means to effect a cut in a tube; said latch means being operable by said operator, after a pre-set depth of cut has been effected to render said gearing means ineffective to operate said operator to further advance said cutter means.

18. A tube cutter comprising, in combination, a support having means for anchoring it in a stationary position relative to a tube; carrier means supported by the support and rotatable with respect thereto; cutter means carried by said carrier means and rotatable therewith; an operator supported by said carrier means and movable relative thereto, said operator being operatively connected to said cutter means to advance and retract the same responsive to such relative movement of the operator; differential gearing means operatively interconnecting said carrier means and said operator; and releasable latch means operable to condition said gearing means to operate said operator to advance said cutter means at a relatively slow rate to effect a cut in a tube; said latch means being operable by said operator, after a pre-set depth of cut has been effected, to condition said gearing means to operate said operator to retract said cutter means at a relatively fast rate.

19. A tube cutter comprising, in combination, a support having means for anchoring it in a stationary position relative to a tube; carrier means supported by the support and rotatable with respect thereto; cutter means carried by said carrier means and rotatable therewith; an operator supported by said carrier means and movable relative thereto, said operator being operatively connected to said cutter means to advance and retract the same responsive to such relative movement; differential gearing means operatively interconnecting said carrier means and said operator; releasable latch means operable to condition said gearing means to operate said operator to advance said cutter means to effect a cut in a tube; said latch means being operable by said operator, after a pre-set depth of cut has been effected, to condition said gearing means, upon continued rotation of said carrier means in the same direction, to operate said operator to retract said cutter means.

20. A tube cutter as claimed in claim 19 in which said differential gearing means includes a torque responsive releasable clutch.

CLARENCE E. ANDERSON.

No references cited.